CONTINUOUSLY ADJUSTABLE VHF/UHF TELEVISION TUNER

Filed July 29, 1966 3 Sheets-Sheet 1

INVENTOR.
John F. Bell
BY Francis W. Crotty
Attorney

CONTINUOUSLY ADJUSTABLE VHF/UHF TELEVISION TUNER

INVENTOR.
John F. Bell
BY Francis W. Crotty
Attorney

CONTINUOUSLY ADJUSTABLE VHF/UHF TELEVISION TUNER

Filed July 29, 1966

INVENTOR.
John F. Bell
BY Francis W. Crotty
Attorney 3,309,613
Patented Mar. 14, 1967

3,309,613

CONTINUOUSLY ADJUSTABLE VHF/UHF TELEVISION TUNER

John F. Bell, Wilmette, Ill., assignor to Zenith Radio Corporation, Chicago, Ill., a corporation of Delaware Filed July 29, 1966, Ser. No. 568,816
11 Claims. (Cl. 325—459)

This is a continuation-in-part of application Ser. No. 303,822, filed Aug. 22, 1963 and assigned to the assignee of the present invention.

The invention is directed to a tuner for a television receiver which may be continuously tuned over both the VHF and UHF bands. It concerns, more particularly, a tuner in which a single revolution of a channel selecting shaft is adequate to cover both frequency ranges.

As used herein, the expression "VHF band" designates the portion of the frequency spectrum to which the Federal Communications Commission has assigned television channels 2–13. This actually is a segmented band, having channels 2–6 within the range 54–88 megacycles and channels 7–13 within the range 174–216 megacycles. Similarly, the expression "UHF band" is here used to designate the portion of the frequency spectrum to which the Federal Communications Commission has assigned television channels 14–83. It covers the range of 470–890 megacycles. All channels are 6 megacycles wide and, except for the voids between the several identified bands, there is for the most part uniform frequency spacing between successive channel assignments.

The overall range embraced by the channel assignment (54–890 megacycles) coupled with the voids or discontinuities between channels 6 and 7 as well as between channels 13 and 14 make abundantly clear the difficulty of constructing an all channel tuner that is acceptable for commercial use. A number of approaches have been made heretofore. Generally, they adopt two discrete tuners, one to cover the VHF band and the other to cover the UHF band, and correlate the two devices in a common assembly for actuation by a single channel selection shaft. An illustrative tuner of this type is the subject of the earlier-filed application, Ser. No. 303,822.

The arrangement to be described is a further development of that of the earlier application. It achieves most desirable simplifications in structure and reduction in overall size by, in effect, interleaving or interlacing components of a VHF and UHF tuner to the end that there is one tuning structure created in which the adjustable elements for tuning over the VHF band are housed with the counterparts for tuning over the UHF band, that is to say, the VHF input selectors and the UHF input selectors share a common RF compartment. As a consequence, the complex structure while permitting channel selection over the entirety of the VHF and UHF bands requires little more space than an acceptably performing UHF tuner currently in wide commercial use.

It is, therefore, a principal object of the invention to provide a new and improved system for selectively tuning a television receiver to any channel within the VHF and UHF frequency bands.

It is another specific object of the invention to provide such a system that is continuously adjustable throughout both frequency bands within a single revolution of a channel selection shaft or control knob.

It is yet another object of the invention to provide such a tuning system for a television receiver that has drastically reduced overall dimensions in comparison with prior art structures.

A system constructed in accordance with the invention for selectively tuning a television receiver to any channel within the UHF and VHF frequency bands comprises a shield housing. This housing has partitions which define several compartments that are normally assigned to house portions of the radio frequency, heterodyning oscillator, and mixer stages of the receiver. An adjustable tuning arrangement is included in each of the compartments and comprises a rotatable shaft that is common to all of the compartments as well as a UHF tuner continuously adjustable over the entire UHF band. This tuner has a UHF rotor supported on the tuning shaft and a UHF stator positioned within the compartment to have effective coupling with the UHF rotor over a first range of angular displacements of the tuning shaft. There is a VHF tuner in each compartment which is, likewise, continuously adjustable over the two-band segments which collectively define the VHF band. This tuner includes a VHF rotor supported on the tuning shaft and a pair of VHF stators angularly displaced from one another along the path of movement of the VHF rotor and positioned within the compartment to have effective coupling with the VHF rotor over a second and a third range of angular displacements of the tuning shaft which are mutually exclusive of one another and exclusive of the aforesaid first range of shaft displacements. There is a switching system provided for functionally connecting the stators accommodated by the shield housing in operating relation to the remainder of the receiver, seriatim. This system includes a switch operator supported on the tuning shaft and having active elements oriented on that shaft to effect a switching function only during angular displacements of the tuning shaft that fall between the aforesaid first, second and third ranges of shaft displacement.

The foregoing statement of invention characterizes the UHF and VHF tuning devices as continuously adjustable over the UHF and VHF bands, respectively. This expression is accurate in respect of such adjustable components as the input and output selectors of the RF amplifier and the input selector of the first detector or mixer. As applied to the tunable elements of the heterodyne oscillators, however, the language must be construed to embrace adjustment of such oscillators over frequency ranges which are not identically the same as the ranges of channel frequencies but which are displaced therefrom in accordance with established principles of superheterodyne reception to the end that the output of the mixer is a signal of a predetermined intermediate frequency for whatever channel is selected from either the UHF or VHF band for reception.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figures 2, 3:
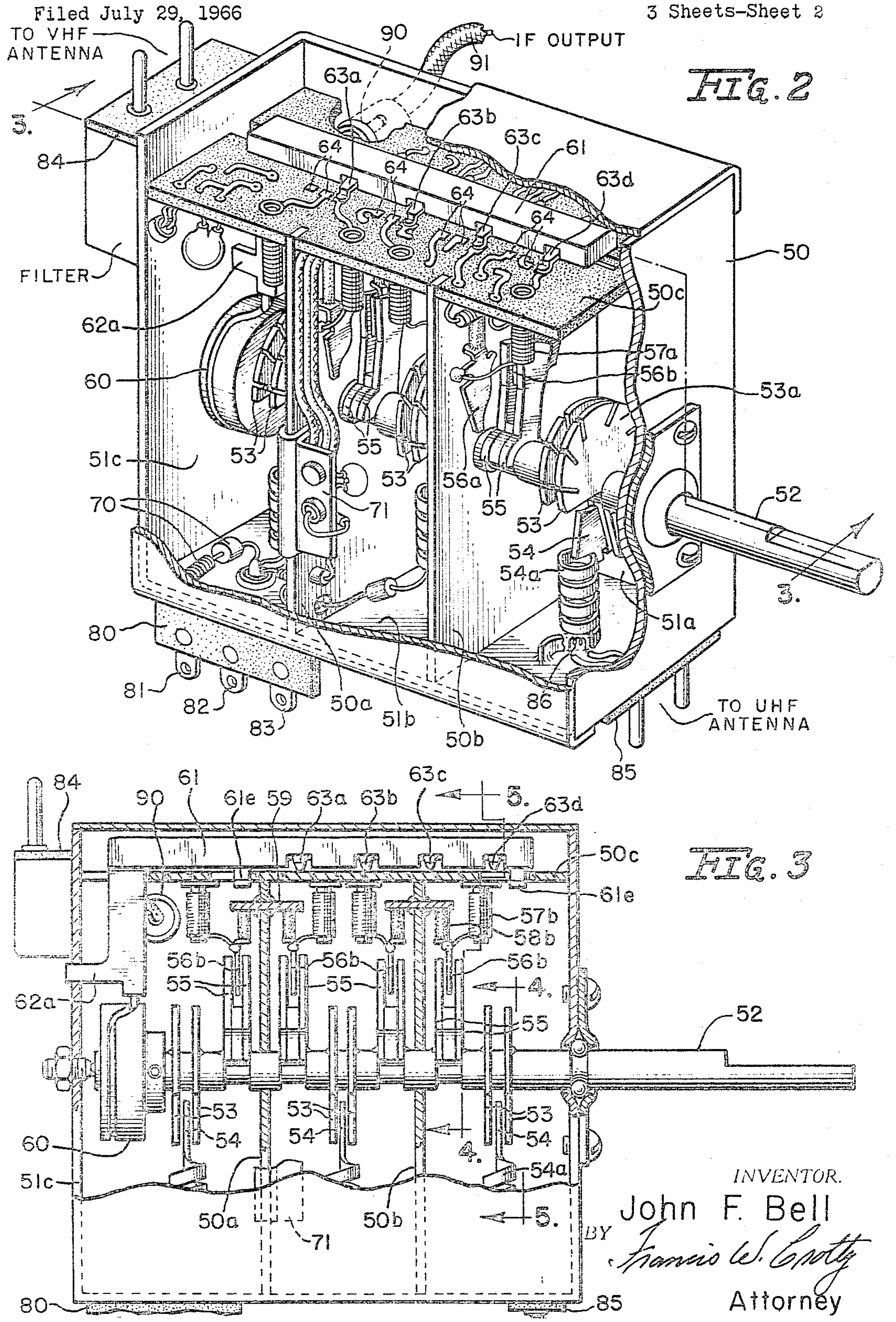
FIGURE 2 is a view partially broken away of the VHF/UHF tuner.
FIGURE 3 is a further sectional view of the tuner, taken along section-line 3—3 in FIGURE 2.
Figures 5, 6, 7, 8:
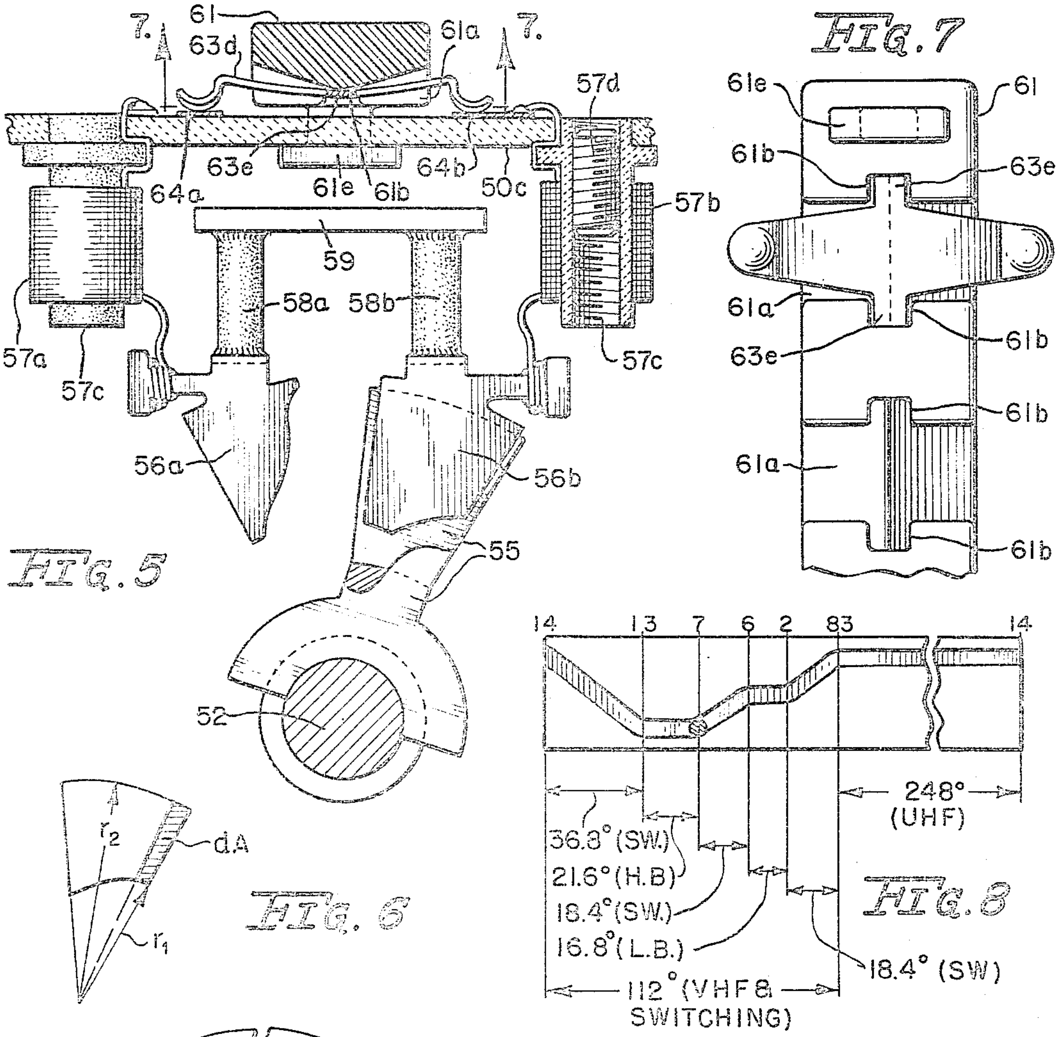
Figure 4:
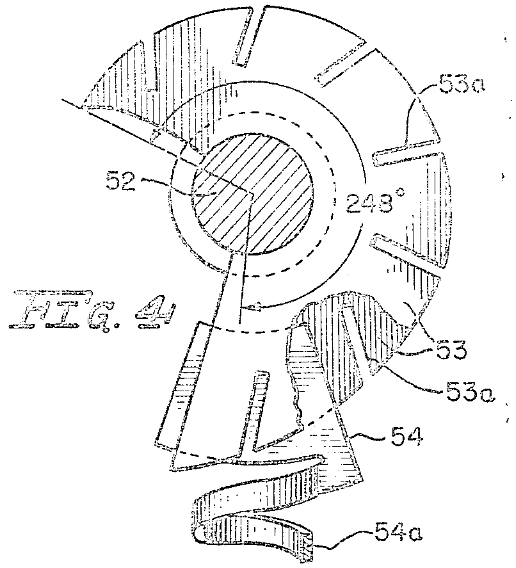
Figure 9:
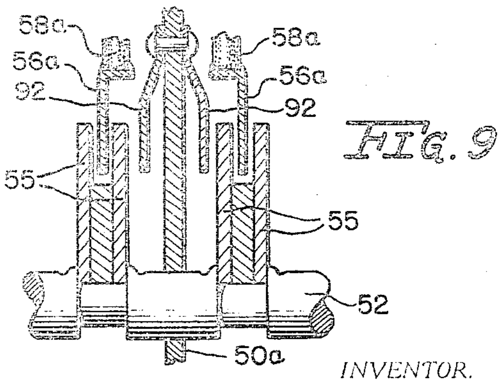

FIGURES 4 and 5 are detail views taken as indicated by section-lines 4—4 and 5—5 of FIGURE 3;

FIGURE 6 is a view used in explaining the development of the stator of the VHF tuner;

FIGURE 7 is a detail view taken along section-line 7—7 of FIGURE 5;

FIGURE 8 is a development plan of a switching cam included in a structure of FIGURE 2; and FIGURE 9 is a modification of the VHF structure.

As stated above, the tuning arrangement to be described is a further development of the television receiving system of the earlier filed application, differing principally in the structure of the VHF/UHF tuner itself as distinguished from the other stages of the receiver. Accordingly, the description will be confined most particularly to the electrical and mechanical features of the tuner and reference may be had to the earlier filed application, which is incorporated herein by reference, for other details of the receiving system.

Figure 1:
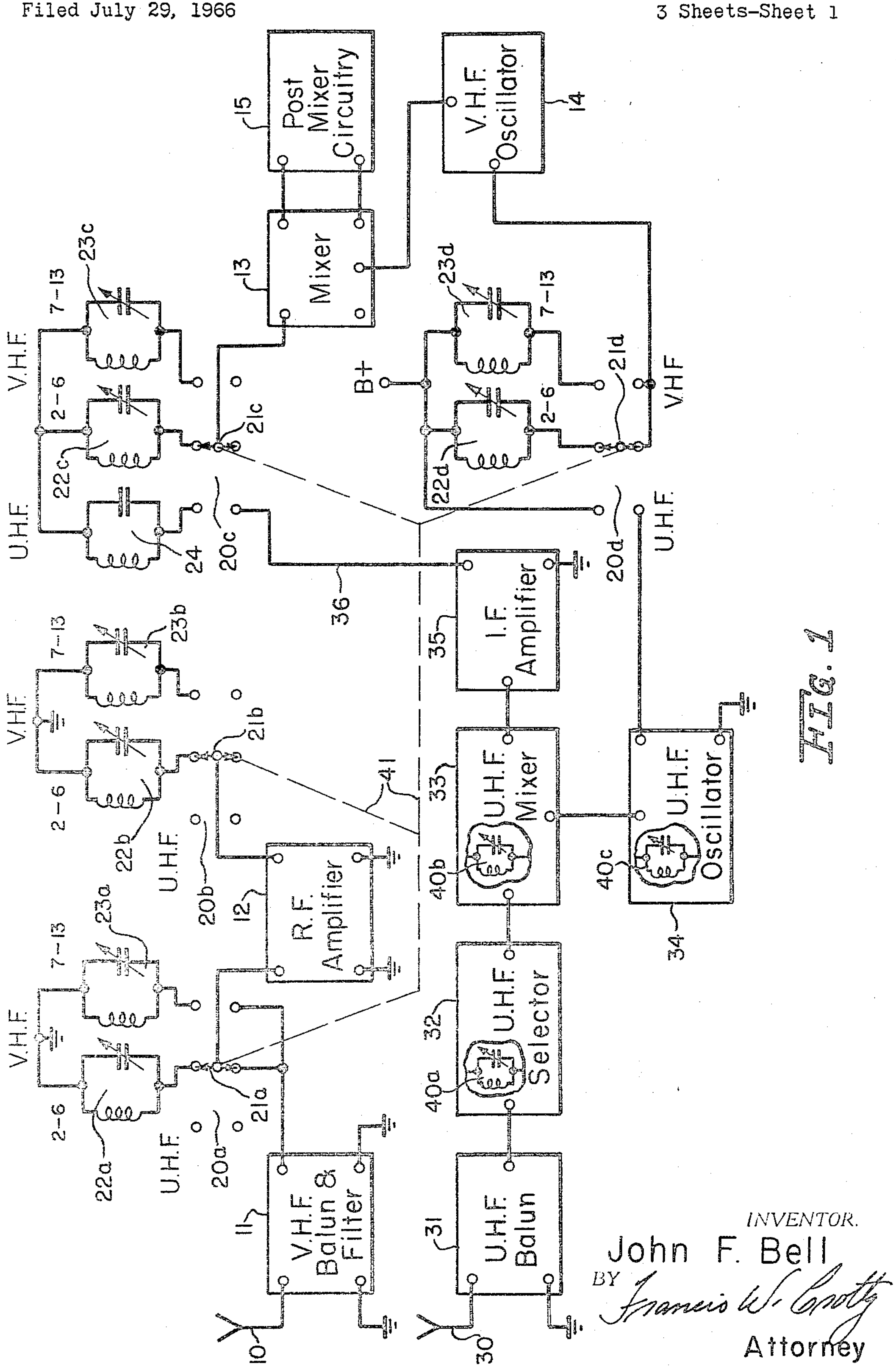
FIGURE 1 is a schematic representation of a television receiver including a VHF/UHF tuning system embodying the invention.

Initially, attention is directed to the schematic circuit diagram of FIGURE 1 which concerns those portions of the receiver to which the invention relates. The receiving system is selectively tunable to any channel within the VHF and UHF frequency bands. Accordingly, it has a VHF antenna 10 which is coupled through a balun and filter 11 to a radio frequency amplifier 12, their coupling being acomplished through a switch 20*a* which has three contact pairs that may be selectively closed by movement of a slidable contact 21*a*. For convenience, the legend "UHF" over one contact pair designates the position of switch element 21*a* when the receiver is adjusted for reception of a UHF channel. The legend "VHF2–6" indicates that the center contact pair are employed for reception of any of channels 2–6 in the low frequency portion of the VHF band. Finally, the legend "VHF7–13" over the contact pair in the extreme right indicates that this pair is employed for reception of any of channels 7–13 in the high frequency portion of the VHF band. It will be observed that no connections are made to the UHF termnial pair and that balun 11, which is a network for converting from balanced to unbalanced conditions, connects with each of the remaining contact pairs. A capacitively tuned circuit 22*a*, tunable over the low frequency portion of the VHF band, is also associated with the central contact pair and connects with the input of amplifier 12 with switch contact 21*a* in the position shown. A similar tunable circuit 23*a*, tunable over the high frequency portion of the VHF band, is associated with the remaining contact pair for connection with amplifier 12 when switch element 21*a* is moved to its extreme right hand position.

The output of the amplifier is similar to its input, having a 3-pair switch arrangement with tunable VHF selectors identified by the same reference characters as their counterparts in the input circuit except that they have the subscript *b* rather than *a*.

Amplifier 12 is followed, in the usual way, by a mixer 13 and the coupling between these stages is provided by inductive and capacitive coupling of tuned input selectors. These selectors in the input of the mixer may be rendered effective by a switching arrangement which again is similar to that of the RF amplifier with corresponding components identified by like reference characters but now having a subscript *c* rather than *a*. More specifically, selectors 22*b* and 22*c* are inductively coupled as are selectors 23*b* and 23*c*. It will also be observed that the contact pair on the extreme left of switch section 20*c* connect with a resonant circuit 24 which is fixed tuned to the intermediate frequency of the receiver.

While the input signal is applied to mixer 13 in accordance with the adjustment of switch section 20*c* and the input thereof, a heterodyning signal developed in a VHF oscillator 14 is also applied to the mixer so that for all conditions of operation of the receiver the mixer, in response to a received television program signal, delivers an output signal of a fixed intermediate frequency to the remaining stages of the receiver here designated as post mixer circuitry 15. The operating condition of oscillator 14 is determined by the adjustment of a switch section 20*d* which has three positions UHF, VHF2–6 and VHF7–13. Its central position which is shown in FIGURE 1 permits the operating frequency of the oscillator to be under the control of a capacitively tuned resonant or tank circuit 22*d* which may tune the oscillator to operating frequencies so related to the frequencies of VHF channels 2–6 as required to establish an intermediate frequency of the requisite value in the output of mixer 13. A similar resonant circuit 23*d* is effective when switch element 21*d* is adjusted to its extreme right hand position. In this condition of adjustment, the operating frequency of oscillator 14 is adjustable to establish the frequencies for the reception of VHF channels 7–13, providing in each instance the same intermediate frequency in the output of mixer 13. It is desirable to have oscillator 14 active during VHF reception but not otherwise. While this may be accomplished in a variety of ways, as indicated in FIGURE 1, energizing potential is applied to oscillator 14 through switch section 21*d* and therefore the oscillator is effective only when resonant circuits 22*d* or 23*d* are to be used in tuning the receiver. The remaining switch pair, to the left in FIGURE 1, extends the potential supply to a UHF oscillator to be considered hereafter.

The post mixer circuitry 15, as indicated above, includes the usual stages of the receiver other than that which is usually referred to as the front end. For a monochrome receiver, it includes stages of IF amplification, the video detector and AGC supply, the video amplifier and picture tube which collectively define the IF and picture channels. It will also include the audio stages which generally comprise the intercarrier takeoff, a limiter and discriminator followed by stages of audio amplification and a loudspeaker. Finally, the post mixer circuitry comprises the customary sync signal separator and the line and field sweep systems which are timed by the synchronizing components of a received signal and develop the deflection signals required for applicatiton to the picture tube. Of course, the system may constitute a color receiver in which case unit 15 will also be considered as including the chrominance circuitry but the details of these portions of the receiver are of no particular concern to the subject invention. It should be pointed out, however, that there is an automatic frequency control or AFC supply included in the post mixer circuitry in order that precise tuning adjustments may be established for optimum signal reception.

For response in the UHF range, the system of FIGURE 1 has a UHF antenna 30 coupled through a UHF balum 31 to a UHF selector 32. This selector applies a selected UHF television signal to the tuned input of a UHF mixer 33 which also receives a heterodyning signal from a UHF oscillator 34. The output of mixer 33 is delivered through an IF amplifier 35 to the input of mixer 13 by way of a connection 36 which extends to the left hand contact pair of switch section 20*c* with which there is associated circuit 24 fixed tuned to the IF frequency of the receiver. For convenience of illustration, units 32, 33 and 34 are indicated as including tunable resonant circuits 40*a*, 40*b* and 40*c*. Of these, circuits 40*a* and *b* are continuously tunable over the UHF band while resonant circuit 40*c* is tunable over a band of comparable width but displaced from the tuning of circuits 40*a* and *b* by the desired intermediate frequency.

Broken construction line 41, interconnecting the movable elements of the several switch sections, denotes that these switches are unicontrolled so that their movable elements are always in engagement with the corresponding contact pairs of their switch sections.

There is a similar unicontrolled action of the tunable circuits of the receiver as is customary with superheterodyne receivers and the mechanism by which this is accomplished will be described hereafter. Suffice it so say at the present that for any position of the movable elements of the switch sections, the tunable devices that are instantaneously in functional relation to the input stages of the receiver perforce of the position of the movable switch elements are adjusted and tracked together.

In considering the operation of the receiving system, it will be assumed initially that the movable switch segments are in the positions illustrated. This conditions the receiver to accept a channel within the low frequency segment of the VHF band, the specific channel selected being determined by the adjustment of tunable circuits 22*a*, 22*b*, 22*c* and 22*d*. Having properly tuned these circuits to a desired channel, the program signal intercepted by VHF antenna 10 is amplified in amplifier 12 and mixed with the heterodyning signal from local oscillator 14 in mixer stage 13 to produce an IF signal. This signal, after further amplification, is detected, amplified and employed to intensity modulate the electron beam of the picture tube. Concurrently, an intercarrier component representing the sound portion of the program is detected, amplified and utilized to energize the loudspeaker of the audio system. At the same time, the synchronizing information of the signal is derived and utilized properly to time the line and field scanning systems to the end that the beam of the picture tube traverses a properly timed series of fields of parallel lines while the beam is intensity modulated in order to synthesize an image representing the received signal. Moreover, a gain control voltage is usually derived and applied to stages of amplification which precede the picture detector for the purpose of maintaining the signal input to the detector within a relatively narrow range in spite of fluctuations in intensity of the received signal. And in the preferred installation, as disclosed in the earlier filed application, an automatic frequency control potential is developed to maintain precision in tuning throughout the reception of the program. All of this is well known in the art and constitutes no part of the present invention.

Readjustment of the tunable circuits 22*a*–22*d* permits the instrument to be tuned to receive any of the other ones of channels 2–6.

To utilize channels in the higher portion of the VHF spectrum, movable switch elements 21*a*–21*d* are displaced to their extreme right hand position to connect tunable circuits 23*a*–23*d* in functional relation to the input stages of the receiver. Having thus changed the effective tunable stages, their adjustment permits selection of anyone of channels 7–13. The operation in either of these segments of the VHF band utilizes oscillator 14 to develop the local or heterodyning signal and UHF oscillator 34 is deenergized.

For reception within the UHF band, movable switch elements 21*a*–21*d* are positioned to their extreme left hand contact pair. This disables the VHF parts of the input to the receiver from antenna 10 through amplifier 12 and couples UHF antenna 30 and the UHF input into operating relation to mixer 13. Adjustment of tunable circuits 40*a*–40*c* accomplishes selection of a desired UHF channel which is heterodyned in mixer 33 with a local signal from oscillator 34 to develop an intermediate frequency signal which, after amplification in unit 35, is delivered through mixer 13 to the post mixer circuitry for utilization in the same fashion as described in connection with the reception of the VHF channel. During UHF operation, with switch segment 21*d* in its left hand position, excitation potential shall have been removed from VHF oscillator 14; that oscillator is disabled while UHF oscillator 34 is energized and vice versa. Moreover, mixer 13 functions on UHF reception as a repeater or IF amplifier since it does not receive a local signal from oscillator 14 during such operating intervals.

More particular consideration will now to given to the structural arrangement of the tuning system of the receiver to which the invention is directed.

As indicated in FIGURE 2 essentially the entirety of both the VHF and UHF tunable circuits are contained within a single shield housing 50 which is a closed box type structure formed of conductive metal and having internal partitions 50*a* and 50*b*. These partitions define a RF compartment 51*a*, a mixer compartment 51*b*, and an oscillator compartment 51*c*. Each of these compartments contains tuning arrangements for tuning the front end of the receiver as required to achieve channel selection within the VHF and UHF bands. Capacitive-reactive tuning is employed and since unicontrolled adjustment of the RF, oscillator and mixer stages is necessary, a rotatable tuning shaft 52 is provided and is common to all of these compartments. As shown, shaft 52 extends through apertures provided in at least one end plate of housing 50 and in its partitions and is supported in bearing structures included in each of the end plates. The free end of the shaft is suitably contoured to receive a control knob or other device to facilitate controlled rotational displacement of the shaft. Shaft 52 is electrically as well as mechanically connected to housing 50 which is maintained at a fixed reference potential, specifically, ground.

For the most part the tunable structures of the three compartments of housing 50 are similar and therefore a detailed description will be given of only one, it being understood that the others are of like construction.

More particularly and with reference to RF compartment 51*a*, there is provided in each of the three compartments a UHF tuner continuously adjustable over the entire UHF band. This tuner has a rotor comprised of a pair of similar electrodes 53 supported on shaft 52 as by staking for rotation therewith. There is a stator 54 positioned within the compartment to have effective coupling with rotor 53 over a first range of angular displacements of tuning shaft 52. Actually, the stator is in parallel relation with the rotor and is located midway between the paths of travel of rotor elements 53. The configuration of the UHF rotor or stator elements is shown clearly in FIGURE 4. The rotor plates are identical and although their configuration has been determined empirically, it is subject to calculation to provide tuning over the entire UHF band with a constant tuning characteristic. That is to say, the change in frequency per degree of angular displacement of tuning shaft is constant throughout the tuning range of the rotor-stator combination 53, 54. This range for the configuration illustrated is approximately 248° and since the UHF band has a width of 414 megacycles, this corresponds to 0.6°/megacycle or 3.6° per channel because the channel width is 6 megacycles. Rotor elements 53 have canted knifing slots 53*a* which permit shaping of the tuning characteristic. Stator 54 is a planar extension of coil 54*a* which is constructed to have an electrical length of approximately ¼ wavelength at the high frequency end of the UHF band. One end of coil 54*a* is conductively connected to a wall of housing 50 and it is disposed in parallel relationship to the partition walls of the housing. These walls are maintained at ground potential and in conjunction with coil 54*a* constitute a quarter wavelength section of transmission line which has a variable capacitor termination at one end for changing its effective electrical length to accomplish reactive tuning. Both the electrical and mechanical details of a UHF tuner of the type under consideration are disclosed and claimed in a copending application of Wayne H. Reynolds, Ser. No. 343,281, filed Feb. 7, 1964 and assigned to the same assignee as this invention. Reference may be had to that application especially for the circuitry of such a tuner which, per se, constitutes no part of this invention.

Additionally compartment 51*a* has a VHF tuner that is continuously adjustable over the two band segments which collectively define the VHF television band. Again, this tuner has a two element rotor 55 supported on tuning shaft 52 for rotation therewith. The detail view of FIGURE 5 reveals that rotor 55 is common to a pair of stators 56*a* and 56*b*. These stators are carried by supports 58*a*, 58*b* affixed to a plate 59 which, as illustrated in FIGURE 3, projects through and is mechanically and electrically connected to one of partitions 50*a*, 50*b*. Accordingly, each plate 59 supports two pairs of stators, one pair in one compartment and the other in an adjoining compartment of housing 50. The stators 56$a$, 56$b$ of each such pair are angularly displaced from one another along the path of movement of their associated rotor 55 and are positioned within compartment 51$a$ to have effective coupling to the VHF rotor over second and third ranges of angular displacements of tuning shaft 52, these ranges being exclusive of one another and exclusive of the first range which is assigned, as previously described, to tuning over the UHF band. The stators are electrically connected to a pair of coils 57$a$ and 57$b$ to define therewith tunable parallel resonant circuits. Each such coil is wound on a tubular coil form 57$c$ supported on a shelf or insulated circuit board 50$c$ of housing 50. The coil form is threaded or otherwise arranged to accommodate a tuning slug 57$d$ by means of which trimming may be accomplished at the low end of the band for which each coil is used in channel selection. Electrical connections between the coils and stators are made by terminal extensions of the stators shown in FIGURE 5. The shaping of rotor 55 and stators 56$a$, $b$ is computed to maintain the same tuning characteristic in terms of change in frequency per degree of tuning shaft displacement that exists for UHF tuning. This identity of tuning characteristic established for both segments of the VHF band and for the UHF band is highly desirable to enable the same AFC action to be provided for the receiver throughout the entire television spectrum.

The configuration of the stator plates to achieve the desired tuning characteristic may be computed in the following manner: It is assumed that the leading and trailing edges of stators 56$a$, 56$b$ fall along radii of tuning shaft 52. The dimension $r_2$, see FIGURE 6, is a maximum and has a preselected value. The problem is to determine the stator dimension $r_1$ as a function of the angle $\theta$. In the diagram of FIGURE 6 the elemental area $dA$ may be computed in accordance with the following:

$$dA=(r_2-r_1)\frac{(r_2+r_1)}{2}d\theta \qquad (1)$$

$$dA=+\frac{r_2^2-r_1^2}{2}d\theta \qquad (2)$$

A linear tuning curve requires that the following relations be satisfied:

$$k_1df=d\theta \qquad (3)$$

$$dA=k_2dC \qquad (4)$$

$$\frac{dA}{A}=\frac{dC}{C}=2\frac{df}{f} \qquad (5)$$

Substituting Equations 5 and 3 in Equation 2 gives:

$$\frac{2A}{f}=\frac{r_2^2-r_1^2}{2}k_1$$

Since the area of the stator element is inversely proportional to the square of the frequency it can be expressed:

$$A=\frac{k^3}{f^2}$$

therefore $$\frac{2}{f}\left(\frac{k_3}{f^2}\right)=\frac{r_2^2-r_1^2}{2}k_1 \text{ or } \frac{k_4}{f^3}=r_2^2-r_1^2 \qquad (6)$$

These equations may be solved for the dimension $r_1$ in terms of frequency, which is $$r_1^2=f(\theta)=r_2^2-k_4/f^3 \qquad (7)$$

In Equations 3 to 7:

$k_1$ to $k_4$ are constants, $C$ is tuning capacitance, $dC$ is change in capacitance, $f$ is frequency, $df$ is change in frequency.

The procedure of determining the stator configuration is to compute a preliminary curve by solving Equation 7 for assigned values for $r_1$, $r_2$ and $f$ at the low frequency of the particular band. The frequency value selected is ½ megacycle below midband for channel 2 or 56.5 megacycles as an illustration. Having determined the value of constant $k_4$ from fixed conditions at the low frequency end, values for $r_1$ at the midband of each channel are computed and a plot of these values of $r_1$ is made in accordance with the assumed tracking characteristic of the UHF band, most particularly:

$$d\theta/df=6°/\text{mc.} \qquad (8)$$

A stator is now constructed in accordance with the curve computed as described. Using that stator, a value of $k_4$ is recalculated for each point to permit recomputation of the several values of $r_1$. This is now the corrected value of $r_1$ taking into consideration fringing effects and possible changes in the condenser plate spacing, all of which are necessary to obtain the desired tuning characteristic.

Aside from the shaping of the VHF tuning characteristic in relation to that of the UHF characteristic, as described above, the VHF system is generally well known to the art so that circuit and structural details, beyond what have already been recited, are not required and have been omitted for purposes of simplification. A representative system, in terms of electrical arrangement and functions, is disclosed in the afore-identified parent application.

In describing both the VHF and UHF tuners above, it was pointed out that the rotors have effective coupling with their associated stators over certain ranges of shaft displacement. This expression is intended to mean that the coupling causes the tunable circuits to have a frequency within its assigned frequency band, that is to say, the UHF rotor has effective coupling with its stator only during operating conditions in which it accomplishes tuning to frequencies within the UHF band of television channels. The same criterion applies for the significance of the expression "effective coupling," of the VHF rotor to either of its stators.

There is a switching system within housing 50 for functionally connecting the several stators in operating relation to the remainder of the television receiver seriatim. This system includes a switch operator or multisection cam 60 located within compartment 51$c$ and mounted on tuning shaft 52 for rotation therewith. The switching system further comprises a movable switch 61 slidably supported on shelf 50$c$ of housing 50 to span two series of stationary contacts 64$a$, 64$b$ of shelf 50$c$ to which various circuit connections, including connections to coils 57, are made. Switch 61 has bridge contact elements 63$a$–63$d$ that are received in transverse slots 61$a$ as shown in FIGURES 5 and 7. Each such contact element has extensions 63$e$ that extend into cut-outs 61$b$ of switch 61, provided to lock contacts 63 against rotation. As also shown in FIGURE 5, the depth of slots 61$a$ is dimensioned in relation to the height of stationary contacts 64 and the configuration of contact elements 63 so that the latter are yieldably forced into engagement with fixed contacts 64 as switch 61 reciprocates on shelf 50$c$. T-shaped locking elements 61$e$ extending from switch member 61 and passing through slots in circuit board 50$c$, see FIGURE 5, limit vertical movement of member 61 to maintain a desired contact pressure.

The movable part 61 of the switch further has a cam portion 62 which projects through a slot of the shelf into compartment 51$c$ and into the path of movement of cam 60 to cooperate therewith as a cam follower. As shown, cam 60 has a track defining the desired cam contour and a pin extends from cam follower 62 into that track. Conversely, the cam may be a disc type member of appropriate contour and cam following portion 62 may have a bifurcated end which straddles the cam. Switch operator 61 may have fingers 61$e$ received within slots of shelf 50$c$ further to guide and define the path of movement of the switch. Additionally, an end wall of the housing may be apertured to receive an extension 62$a$ of the cam follower to retain it against rotational as distinguished from reciprocating motion.

The chart of FIGURE 8 illustrates the division of one complete revolution of tuning shaft 52 in terms of tuning and switch functions. This division is determined by the relative size, shape and position of the rotors, the stators and the switch cam. As shown, a range of 248° is devoted for UHF tuning which embraces channels 14 to 83. The next 18.4° is devoted to a switching function as contacts 63 move, for example, from the right end of a group of three stationary contacts 64 to engage the center one of the group. The next succeeding 16.8° is allotted to the tuning over the low VHF band including channels 2–6. This is followed by another switching interval of 18.4° as movable switch elements 63 move from the center to the left end of the cluster of stationary contacts. Thereafter, a 21.6° range of shaft displacement is devoted to high VHF tuning for selection of channels 7 to 13. The final range of 36.8° is again devoted to switching as movable contacts 63 quickly move from the left to the right end of the cluster of stationary contacts.

It is most desirable that the switching, through which the receiver is rendered responsive in the three portions of the frequency spectrum in which television channels have been assigned, be completed comfortably before the receiver is turned to any end channel of any of these frequency bands. The cam contour is chosen so that switching is accomplished by an amount corresponding to at least 3.6° of shaft displacement before arriving at a shaft position corresponding to a television channel.

It is further desirable and has been found practicably feasible to arrange that the circuitry of the UHF oscillator be included within compartment 51*c*. This is especially the case where the active element of the oscillator is a transistor. Components 70 in FIGURE 2 denote the manner in which these components may be positioned within the UHF compartment. It will be recalled that on UHF reception, the output of UHF mixer 33 is delivered first to an IF amplifier 35 and from there to stage 13 that functions as a mixer in VHF reception. Again, IF amplifier 35 which is utilized only in UHF reception may, if it is transistorized, be constructed on a circuit board 71 positioned within mixer compartment 51*b*. If like manner, it is preferred that the remaining circuit components of the UHF and VHF tuning systems be transistorized and be included within housing 50. The principal components, specifically the tunable selectors or resonant circuits, have been described and the others are affixed to terminal elements of circuit board 50*c* where this preferred feature is adapted and housing 50 then accommodates substantially all of the circuitry of the front end for both the UHF and VHF tuning systems. The necessary operating potentials are applied to the enclosed circuitry through a terminal board 80 which may have a terminal 81 for the B supply or energizing potential, a terminal 82 for the AFC potential and a terminal 83 for the AGC potential.

A terminal board 84 is provided for connection with the VHF antenna. It has associated with it the filter and balun 11 the output of which connects to the RF amplifier by means of connections (not shown) accomplished on circuit board 50*c*. Similarly, there is a terminal board 85 for connection with the UHF antenna and in this case a coil 86 within RF compartment 51*a* serves both as the balun and the input connection to the UHF selector of the receiver. An output, which is an IF signal whether reception is on VHF or UHF, is derived at a terminal 90 for application via conductor 91 to post mixer circuitry 15.

In one physical embodiment of the described tuning system, it has been found possible to include the entire front end of the television reecviver for selecting any channel within the UHF and VHF bands with a structure that has overall dimensions of 3 x 3 x 1.6 inches.

It has been indicated above that permeability tuning by means of slugs 57*d* may be used for trimming at the low frequency portions of the tuning bands. Additionally trimming at the high end of the band, if this should be desirable, may be provided by means of a trimmer capacitor comprising an electrode 92, which as shown in FIGURE 9 is supported by a partition wall 50*a* or 50*b* in coupling relation to a VHF stator designated 56*a*. These elements 56*a* and 92 are located in space opposed relation on opposite sides of the path of travel of rotor element 55 so that as the rotor becomes effective by moving into greater coupling relation into stator 56*a*, it supersedes the effectiveness of the electrode 92 which, therefore, serves essentially only for trimming at the high end of the band. With the illustrated structure, this trimming technique for the high end of the band is employed only for the VHF range.

Rotation of the tuning shaft for channel selection may be accomplished in a variety of ways. Obviously, a control knob affixed to the free end of the tuning shaft permits manual adjustment in well known manner. Remote control of channel selection has been described in connection with the parent application and the same control apparatus is useful with the tuning structure herein described. It is also known in the art to achieve signal seeking in which a tuning shaft is motor driven over a range with provisions for interrupting the motor drive anytime a signal is received. Signal seeking is not usually employed in television receivers because of the possibility of misadjustment since the receiver system is not able to distinguish between the video and audio components of a broadcast and may lock to the audio rather than the video signal. If the AFC system which interrupts tuning and locks to a received signal is of the type described in an application of Roy F. Baker, Ser. No. 541,624, filed Apr. 11, 1966, and assigned to the assignee of the subject invention, rotation of the tuning shaft in one direction may be employed for signal seeking with much reduced likelihood of locking to an unwanted audio signal as explained in the Baker application.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A system for selectively tuning a television receiver to any channel within the VHF and UHF frequency bands comprising:

a shield housing having partitions which define radio frequency, oscillator and mixer compartments; adjustable tuning arrangements in each of said compartments individually comprising a rotatable tuning shaft that is common to all said compartments, a UHF tuner continuously adjustable over the entire UHF band having a rotor supported on said shaft and having a stator positioned within said compartment to have effective coupling with said UHF rotor over a first range of angular displacements of said shaft, a VHF tuner continuously adjustable over two band segments which collectively define the VHF band and including a common rotor supported on said shaft and a pair of stators angularly displaced from one another along the path of movement of said VHF rotor and positioned within said compartment to have effective coupling with said VHF rotor over a second and a third range of angular displacement of said shaft which are mutually exclusive of one another and exclusive of said first range;

and a switching system for functionally connecting said stators in operating relation to the remainder of said receiver seriatim, including a switch operator supported on said shaft and having active elements oriented on said shaft to effect a switching function only during angular displacements of said shaft that are between said first, second and third ranges.

2. A VHF/UHF tuning system in accordance with claim 1 in which the tuning characteristic in terms of change in frequency per degree of angular displacement of said shaft is substantially the same throughout said first, second and third ranges of shaft displacement.

3. A VHF/UHF tuning system in accordance with claim 1 including an automatic frequency control arrangement for maintaining said tuning system accurately adjusted to any channel selected from either said VHF or UHF bands.

4. A VHF/UHF tuning system in accordance with claim 1 in which there is at least one trimmer capacitor comprising an electrode plate supported in one of said compartments in coupling range to an assigned one of said stators but located on the opposite side of the path of travel of the rotor associated with said one stator.

5. A VHF/UHF tuning system in accordance with claim 1 in which said switching system accomplishes its switching function while said tuning shaft is at least 3° displaced from a channel-selection position.

6. A VHF/UHF system in accordance with claim 1 in which said first range is approximately 248° and said second and third ranges are approximately 17 and 22°, respectively.

7. A VHF/UHF tuning system in accordance with claim 1 in which said switching system comprises a multisection cam mounted on said shaft and a movable switch slidably supported on said housing and having a cam engaging portion projecting into said housing in the path of movement of said multisection cam.

8. A VHF/UHF tuning system in accordance with claim 1 in which the oscillator compartment of said housing includes, in addition to said UHF tuner, substantially all of the circuitry of a tunable UHF oscillator.

9. A VHF/UHF tuning system in accordance with claim 1 in which said housing further includes essentially all of the electrical circuitry constituting the UHF oscillator and mixer stages of said television receiver.

10. A VHF/UHF tuning system in accordance with claim 1 in which said housing further includes essentially all of the circuit elements constituting the UHF oscillator and mixer stages as well as the circuitry of the VHF mixer stage of said television receiver.

11. A system for selectively tuning a television receiver to any channel within the VHF and UHF frequency bands comprising:

a shield housing having partitions which define radio frequency, oscillator and mixer compartments; adjustable tuning arrangements in each of said compartments individually comprising a rotatable tuning shaft that is common to all said compartments, a UHF tuner continuously adjustable over the entire UHF band in the form of a quarter wave transmission line having a variable reactance at one end for changing its effective electrical length for tuning, said reactance comprising a first member supported on said shaft and a second member secured to said one end of said transmission line to have effective coupling with said first member over a first range of angular displacements of said shaft, a VHF tuner continuously adjustable over the VHF band and including a rotor supported on said shaft and a stator positioned within said compartment to have effective coupling with said VHF rotor over a second range of angular displacements of said shaft which is exclusive of said first range;

and a switching system for functionally connecting said stators in operating relation to the remainder of said receiver seriatim, including a switch operator supported on said shaft and having active elements oriented on said shaft to effect a switching function only during angular displacements of said shaft that are between said first and second ranges.

No references cited.

KATHLEEN H. CLAFFY, *Primary Examiner.*

R. LINN, *Assistant Examiner.*